(12) United States Patent
Rowell et al.

(10) Patent No.: US 10,720,965 B2
(45) Date of Patent: Jul. 21, 2020

(54) MEASUREMENT SYSTEM AND METHOD FOR OPERATING A MEASUREMENT SYSTEM

(71) Applicant: Rohde & Schwarz GmbH & Co. KG, Munich (DE)

(72) Inventors: Corbett Rowell, Munich (DE); Vincent Abadie, Hoehenschaeftlarn (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/921,132

(22) Filed: Mar. 14, 2018

(65) Prior Publication Data

US 2019/0288748 A1 Sep. 19, 2019

(51) Int. Cl.
| | |
|---|---|
| *G01R 29/10* | (2006.01) |
| *H04B 5/00* | (2006.01) |
| *H04B 17/10* | (2015.01) |
| *H04B 17/14* | (2015.01) |
| *H04B 17/12* | (2015.01) |
| *H01Q 1/52* | (2006.01) |

(52) U.S. Cl.
CPC ........... *H04B 5/0043* (2013.01); *H01Q 1/526* (2013.01); *H04B 17/103* (2015.01); *H04B 17/12* (2015.01); *H04B 17/14* (2015.01)

(58) Field of Classification Search
None
See application file for complete search history.

(56) References Cited

U.S. PATENT DOCUMENTS

| | | | | |
|---|---|---|---|---|
| 9,964,577 | B2* | 5/2018 | Qi | ........................ G01R 29/10 |
| 10,012,683 | B2* | 7/2018 | Qi | ........................ G01R 29/08 |
| 2005/0059355 | A1* | 3/2005 | Liu | ....................... H04B 17/391 |
| | | | | 455/67.14 |
| 2010/0158088 | A1* | 6/2010 | Kim | .................... H04B 17/0085 |
| | | | | 375/224 |
| 2010/0233969 | A1* | 9/2010 | Frolik | ............... H04B 17/0082 |
| | | | | 455/67.14 |
| 2014/0141727 | A1* | 5/2014 | Kildal | ............... G01R 29/0821 |
| | | | | 455/67.12 |
| 2014/0327586 | A1* | 11/2014 | Huff | .................... G01R 29/0821 |
| | | | | 343/703 |
| 2016/0054440 | A1 | 2/2016 | Younis | |
| 2018/0006745 | A1 | 1/2018 | Vanwiggeren | |

* cited by examiner

*Primary Examiner* — Tuan A Tran
(74) *Attorney, Agent, or Firm* — Christensen O'Connor Johnson Kindness PLLC

(57) ABSTRACT

A measurement system comprising a device under test, at least a first antenna and a second antenna, a reflector device, a shielded space and a signal analysis module is disclosed. The first antenna is configured to at least one of generate electromagnetic waves directed to the reflector device and receive electromagnetic waves reflected by the reflector device. The reflector device is configured to reflect electromagnetic waves between the first antenna and the device under test. The second antenna is positioned in a near-field area of the device under test. At least the second antenna is connected to the signal analysis module, and the device under test, the first antenna, the second antenna and the reflector device are assigned to the shielded space. Moreover, a method for operating a measurement system is disclosed.

11 Claims, 2 Drawing Sheets

MEASUREMENT SYSTEM AND METHOD FOR OPERATING A MEASUREMENT SYSTEM

FIELD OF THE DISCLOSURE

Embodiments of the present disclosure relate generally to a measurement system as well as methods for operating a measurement system.

BACKGROUND

Antennas or other devices emitting electromagnetic waves are usually configured to emit electromagnetic waves with predetermined characteristics such as frequencies or within predetermined frequency bands. Besides these desired emissions, the antennas or the devices also emit electromagnetic waves outside of the predetermined frequency bands.

For performance tests of antennas or other devices emitting electromagnetic waves, it is important to identify these spurious (i.e. out of band) emissions of the device under test as these spurious emissions lower the overall power efficiency of the device under test in the desired frequency bands.

Accordingly, there is a need for a measurement system as well as a method for operating a measurement system that is capable of identifying spurious emissions of a device under test in an easy and efficient manner.

SUMMARY

Embodiments of the present disclosure provide a measurement system. The measurement system comprises a device under test, at least a first antenna and a second antenna, a reflector device, a shielded space and a signal analysis module. The first antenna is configured to generate electromagnetic waves directed to the reflector device and/or to receive electromagnetic waves reflected by the reflector device. The reflector device is configured to reflect electromagnetic waves between the first antenna and the device under test. The second antenna is positioned in a near-field area of the device under test. At least the second antenna is connected to the signal analysis module. The device under test, the first antenna, the second antenna and the reflector device are assigned to the shielded space.

With the measurement system according to the present disclosure, spurious emissions of the device under test can be measured in a near field of the device under test via the second antenna in an efficient manner. Moreover, far field properties of electromagnetic waves emitted by the device under test may be measured via the first antenna, for example, simultaneously to the measurement of the spurious emissions. The reflector device allows for a compact measurement system as far-field conditions are generated by the reflector device in an area of the shielded space that would otherwise be considered as a near-field area. Thus, the first antenna can be located closer to the device under test and a size of the shielded space can be reduced appropriately. Therefore, embodiments of the disclosure provide a measurement system capable of fast, simple and cheap identification of spurious emissions and measuring of the device under test.

According to an aspect, at least one of the first antenna and the device under test is configured to generate electromagnetic waves within a predetermined frequency band. The first antenna and/or the device under test may be configured to generate electromagnetic waves within several predetermined frequency bands. The predetermined frequency band(s) correspond(s) to useful frequencies employed during operation of the device under test.

According to a further aspect, at least one signal generation module being connected to at least one of the first antenna and the device under test. In some embodiments, the signal generation module is configured to generate electromagnetic waves within the one or several predetermined frequency band(s) via the device under test and/or via the first antenna.

In a certain embodiment of the present disclosure, the second antenna is configured to receive an electromagnetic signal provided by the device under test. In some embodiments, the second antenna is configured to receive the electromagnetic signal and to provide a corresponding measurement signal to the signal analysis module, where the measurement signal is analyzed and/or stored for further processing.

In another embodiment, at least one of the first antenna and the second antenna is configured as a link antenna. Therefore, the first antenna and/or the second antenna may be configured to forward an electromagnetic signal to the device under test and/or to other antennas.

At least one of the first antenna and the second antenna may be stationary relative to the shielded space. In other words, the first antenna and/or the second antenna are mounted immovably in the shielded space. Therefore, a relative position of the antennas, and in particular a relative position of the first antenna and the reflector device, may be accurately adjusted such that equal test conditions are provided for consecutive tests of several devices.

According to another aspect, a positioning unit is provided that is configured to adjustably hold the device under test in a position. Therefore, the position of the device under test may be adjusted such that different emission directions of the device under test can be probed by the first antenna and the second antenna. This way, a beam emission pattern of the device under test may be determined.

In a further aspect, the positioning unit is configured to adjust a position of the device under test in two dimensions or in three dimensions. In particular, the positioning unit is configured to rotate and/or move the device under test. Put another way, the positioning unit is configured for rotational and/or translational movement of the device under test. The rotational movement may be performed around several different axes. This way, a full beam emission pattern of the device under test may be determined, in particular with regard to different angular positions.

According to another embodiment of the present disclosure, a third antenna being mounted stationary relative to the device under test is provided. In some embodiments, the third antenna is adjustably held by the positioning unit. When the device under test is rotated and/or moved, the third antenna is rotated and/or moved simultaneously such that a relative distance and a relative rotation angle between the device under test and the third antenna remains constant. Therefore, electromagnetic waves at the device under test and at the third antenna have a constant and known phase relation. This phase may be measured via the third antenna and used as a phase reference for measurements with the second antenna.

According to a further aspect, a shielding member is provided, the shielding member being assigned to the shielded space, and the shielding member being positioned between the first antenna and the second antenna. The shielding member can be used to separate a far-field area of the device under test from a near-field area of the device under test. Electromagnetic waves can only travel between the first antenna and the device under test via the reflector device, which reflects electromagnetic waves between the first antenna and the device under test. In other words, the shielding member is positioned such that no electromagnetic waves can travel directly between the device under test and the first antenna. Moreover, no electromagnetic waves can propagate directly between the first antenna and the second antenna. Due to the extra travelling distance established by the reflection via the reflector device, a far-field area is created in an area that would otherwise be a near-field area.

Embodiments of the present disclosure also provide a method for operating a measurement system. The method comprises the following steps:

emitting electromagnetic waves within a predetermined frequency band via a device under test;

measuring a far field of the electromagnetic waves in a far-field area of the device under test via a first antenna;

measuring a near field of the electromagnetic waves in a near-field area of the device under test via a second antenna; and identifying spurious emissions in the measured near field.

Regarding the advantages, reference is made to the explanations given above which apply mutatis mutandis for the method.

According to one embodiment of the present disclosure, the electromagnetic waves are actively generated by the device under test. Accordingly, the properties of the device under test in an active sending mode (active transmitting mode) can be tested.

According to a further aspect, the device under test is induced to emit the electromagnetic waves by electromagnetic waves emitted by the first antenna. In this particular embodiment, passive sending properties of the device under test can be examined.

Embodiments of the present disclosure further provide a method for operating a measurement system. The method comprises the following steps:

emitting electromagnetic waves within a predetermined frequency band via a first antenna;

inducing a device under test to emit electromagnetic waves by the electromagnetic waves emitted by the first antenna;

measuring a near field of the electromagnetic waves in a near-field area of the device under test via a second antenna; and identifying spurious emissions in the measured near field.

Regarding the advantages, reference is made to the explanations given above which apply mutatis mutandis for the method.

In one aspect, the measured near field is transformed to a corresponding far field. In particular, the corresponding far field is determined from the near field measured for several positions of the device under test. Put another way, a far field beam pattern of the spurious emissions of device under test is derived from its near field emission behavior. According to a particular embodiment, the far field is calculated from the near field employing a Fourier transform, in particular a fast Fourier transform (FFT). This may apply for both methods mentioned above, namely the active transmission as well as the induced transmission.

According to another aspect, a reference phase of the electromagnetic waves emitted by the device under test is measured via a third antenna. As a distance of the third antenna (which may be held in position by the same positioning unit as the device under test) to the device under test is constant, there is a constant phase relation between electromagnetic waves at the device under test and at the third antenna. Therefore, the determined phase may serve as a phase reference for the transformation of the near field to the far field, in particular for the (fast) Fourier transform. This can also apply for both methods mentioned above, namely the active transmission as well as the induced transmission.

In a certain embodiment of the present disclosure, the device under test is at least one of rotated or moved to a new position and the following steps are repeated at the new position:

emitting electromagnetic waves within a predetermined frequency band via the device under test;

measuring a near field of the electromagnetic waves in a near-field area of the device under test via the second antenna; and identifying spurious emissions in the measured near field.

These steps may be repeated several times for different positions of the device under test. This way, a beam emission pattern of the device under test can be determined, for example via a (fast) Fourier transform as explained above. These steps may be done in both methods mentioned above, namely the methods relating to the active transmission of the device under test as well as the induced transmission of the device under test.

Optionally, the step of measuring a far field of the electromagnetic waves in a far-field area of the device under test via the first antenna is also performed.

Additional measurements may be performed via the first antenna for several positions of the device under test. For example, a total radiated power of the device under test may be measured via the first antenna.

At least one additional measurement may be performed at a frequency of the spurious emissions via the first antenna. The at least one additional measurement may be repeated for different frequencies of the spurious emissions and/or for different positions of the device under test. In some embodiments, a total radiated power of the spurious emissions of the device under test may be measured. Moreover, a beam emission pattern of the spurious emissions may be determined.

In another embodiment of the present disclosure, a total radiated power metric is applied to at least one beam direction of the device under test. The total radiated power metric may be determined from theoretical calculations and/or calibration measurements made for calibrating the measurement system. The total radiated power metric may then serve as a benchmark for evaluating emission characteristics of the device under test. This way, an objective and reproducible rating scale is provided for evaluating the emission characteristics of the device under test.

According to a further aspect, the total radiated power metric is applied for at least one frequency of the spurious emissions. Thus, an objective and reproducible rating scale is provided for characterizing the spurious emissions of a device under test.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
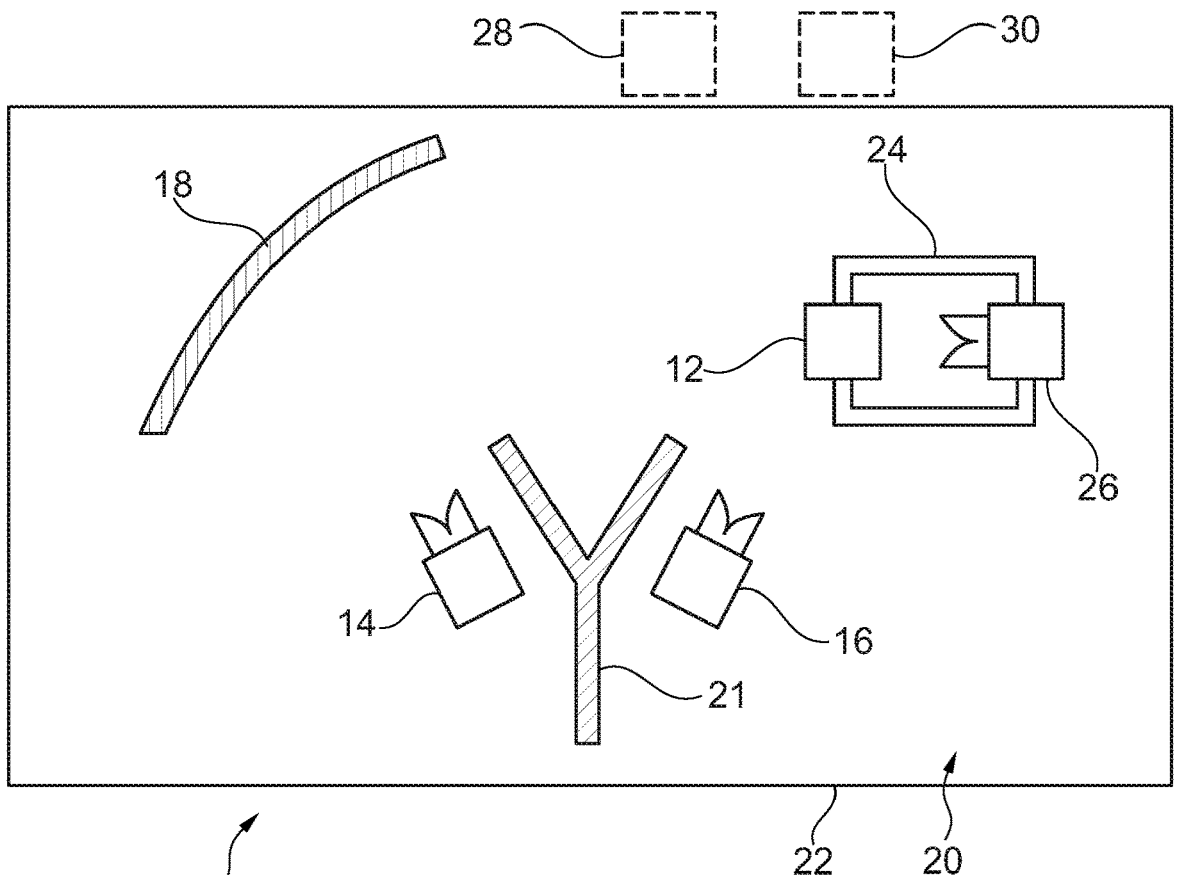
FIG. 1 shows a measurement system according to the disclosure.

FIG. 1 shows a measurement system 10 comprising a device under test 12, a first antenna 14, a second antenna 16 and a reflector device 18 all being assigned to a shielded space 20, for instance a shielded room or a shielded chamber. The first antenna 14 and the second antenna 16 are mounted stationary relative to the shielded space 20.

The first antenna 14 and/or the second antenna 16 may be link antennas configured to forward an electromagnetic signal to the device under test 12 and/or to other antennas. In the particular example shown in FIG. 1, the first antenna 14 and the second antenna 16 are configured as tapered-slot antennas (also called Vivaldi antennas).

The device under test 12 is configured to emit electromagnetic waves with a certain frequency and/or within one or more frequency bands. With regard to the frequency (frequencies) of the electromagnetic waves emitted by the device under test 12 and the associated wavelength(s) of these electromagnetic waves, the second antenna 16 is positioned in a near-field area of the device under test 12. The first antenna 14, however, is positioned in a far-field area of the device under test 12. The far-field area is separated from the near-field area via a shielding member 21. Electromagnetic waves can only travel (propagate) between the first antenna 14 and the device under test 12 via the reflector device 18, which reflects electromagnetic waves between the first antenna 14 and the device under test 12 so that an additional travelling distance for the electromagnetic waves is introduced.

Put another way, the shielding member 21 is positioned such that no electromagnetic waves can travel directly between the device under test 12 and the first antenna 14. Moreover, no electromagnetic waves can travel directly between the first antenna 14 and the second antenna 16. Due to the extra travelling distance via the reflector device 18, a far-field area is created in an area that would otherwise be a near-field area. Accordingly, far field conditions can be tested in a small space.

The reflector device 18 may be at least partly curved so that the reflector device 18 is a shaped one, for example, a parabolic reflector in parts. The shaped reflector device 18 can be used for focusing the electromagnetic waves towards the first antenna 14 or rather the device under test 12.

A surface of the shielding member 21 may be coated with an absorptive material such that electromagnetic waves impinging on the surface of the shielding member 21 are absorbed.

The shielded space 20 may be defined by shielding walls 22 which are configured to absorb and/or reflect electromagnetic waves from the environment of the measurement system 10 such that these electromagnetic waves are blocked off from the shielded space 20. The shielding walls 22 may be metallic walls. Alternatively, the shielding walls 22 may be formed by an arbitrary suitable material coated with an absorptive layer or with an absorptive paint.

A positioning unit 24 is provided in the shielded space 20 that is configured to adjustably hold the device under test 12 in a certain position. This means that the positioning unit 24 generally holds the device under test 12 in a fixed position wherein the position can be adjusted if wanted. Moreover, the positioning unit 24 is configured to adjust the position of the device under test in two or three dimensions. Put another way, the device under test 12 can be rotated and/or moved via the positioning unit 24.

In the embodiment shown in FIG. 1, a third antenna 26 is provided that is mounted stationary relative to the device under test 12. In an embodiment, the third antenna 26 is adjustably held by the positioning unit 24. Therefore, when the device under test 12 is moved and/or rotated by the positioning unit 24, the third antenna 26 is moved and/or rotated simultaneously such that a relative position between the device under test 12 and the third antenna 26 remains unchanged. The device under test 12, the positioning unit 24 and the third antenna 26 together establish a sub-system that is moved and/or rotated commonly.

The measurement system 10 further comprises a signal analysis module 28 being provided inside or outside of the shielded space 20. The signal analysis module 28 is connected to the second antenna 16 in a signal transmitting manner. Further, the signal analysis module 28 may also be connected to the first antenna 14 and/or the third antenna 26. In general, the signal analysis module 28 is configured to analyze signals provided by the antennas 14, 16, 26. The signal analysis module 28 can be implemented in hardware, software, or a combination of hardware and software.

Moreover, the measurement system 10 may comprise a signal generation module 30 being provided inside or outside of the shielded space 20 and being configured to generate electromagnetic waves via the first antenna 14 and/or the device under test 12. Accordingly, the signal generation module 30 is connected to the first antenna 14 and/or the device under test 12 in a signal transmitting manner ensuring that the electromagnetic waves can be coupled into the shielded space 20 for measuring or rather testing purposes.

A method for operating a measurement system, in particular the measurement system 10 described above, is described in the following with reference to FIGS. 2 and 3.

First, electromagnetic waves within a predetermined frequency band are emitted via the device under test 12 into the shielded space 20 (step S1). The electromagnetic waves may be generated actively via the device under test 12. Alternatively, the device under test 12 may be induced to emit the electromagnetic waves by electromagnetic waves generated and emitted by the first antenna 14. The induced transmission relates to a stimulation of the device under test 12 by electromagnetic waves generated by the first antenna 14.

A far field of the electromagnetic waves can be measured via the first antenna 14 (step S2). These electromagnetic waves are emitted by the device under test 12 and travel to the reflector device 18, whereupon the reflector device 18 reflects the electromagnetic waves to the first antenna 14.

Figure 2:
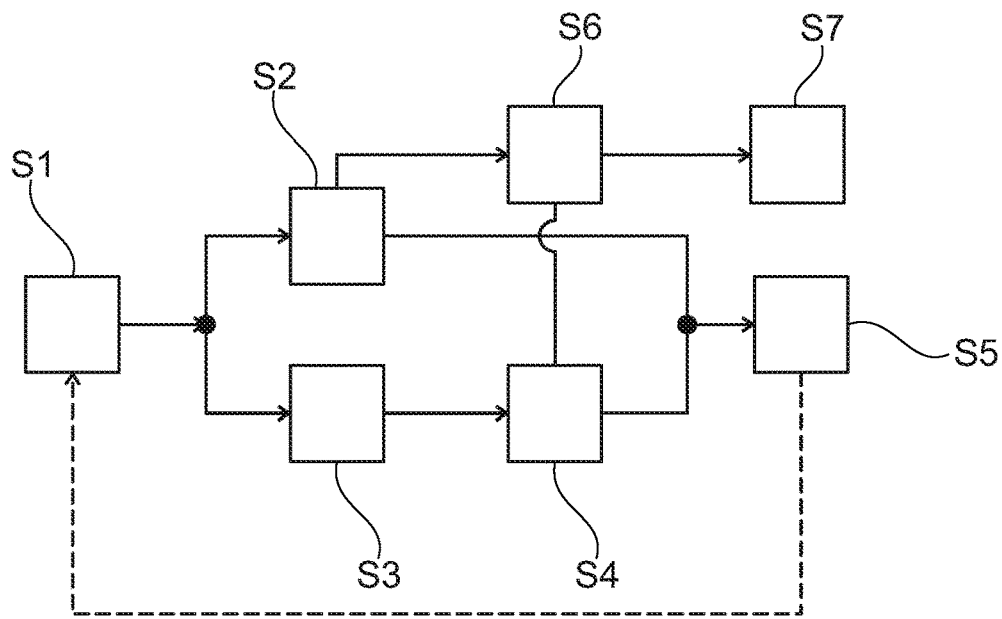
FIG. 2 shows a schematic flow chart of one embodiment of a method according to the disclosure.

In the embodiment shown in FIG. 2, the electromagnetic waves are actively generated via the device under test 12 or the device under test 12 is induced to emit the electromagnetic waves. In this embodiment, the far field of the electromagnetic waves is measured via the first antenna 14.

Figure 3:
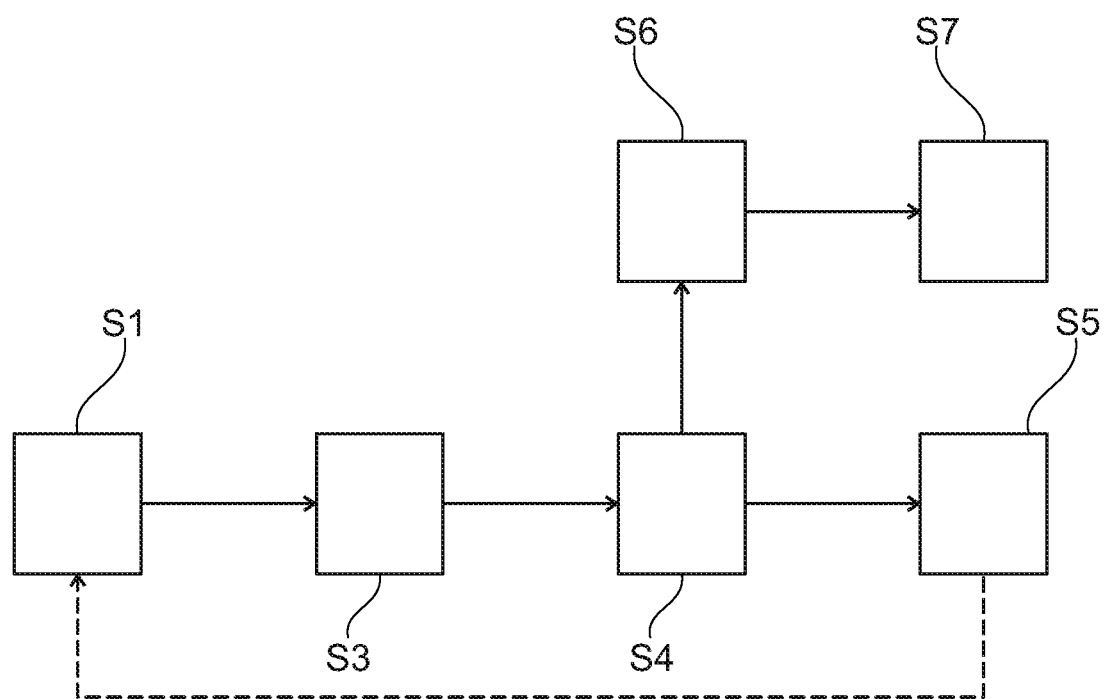
FIG. 3 shows a schematic flow chart of another embodiment of a method according to the disclosure.

In the embodiment shown in FIG. 3, the device under test 12 is induced to emit the electromagnetic waves and the far field of the induced emission is not measured.

A near field of the electromagnetic waves is measured with the second antenna 16 (step S3). These electromagnetic waves are emitted by the device under test 12 and travel to the second antenna 16 directly.

Next, spurious emissions are identified in the measured near field (step S4). For this purpose, the near field is measured by the second antenna 16, and a corresponding measurement signal is provided to the signal analysis module 28, which analyzes the measurement signal. The spurious emissions are characterized in that a frequency of the spurious emissions is not contained within the predetermined frequency band (s).

Next, the device under test 12 is rotated and/or moved to a new position by the positioning unit 24 (step S5). At the new position, steps S1 to S4 are repeated (as indicated by the dashed arrow in FIGS. 2 and 3). The signals measured by the first antenna 14 and/or the second antenna 16 may be stored in the signal analysis module 28 for further processing.

Additional measurements may be performed via the first antenna 14 for several positions of the device under test 12. For example, a total radiated power of the device under test 12 may be measured via the first antenna 14. Moreover, additional measurements may be performed at frequencies where the spurious emissions have been identified. In particular, a total radiated power of the spurious emissions of the device under test 12 may be determined.

A corresponding far field may be determined from the measured near field (step S6), e.g., by the signal analysis module 28. In particular, the corresponding far field is determined from the near field measured for several positions of the device under test 12. Put another way, a far field beam pattern of the spurious emissions of device under test 12 is derived from its near field emission characteristics. According to a particular embodiment, the far field is calculated from the near field by employing a Fourier transform, in particular a fast Fourier transform (FFT).

For this purpose, a phase of the electromagnetic waves emitted by the device under test 12 may be determined via the third antenna 26. As a distance of the third antenna 26 to the device under test 12 is constant, there is a constant phase relation between electromagnetic waves at the device under test 12 and the third antenna 26. Therefore, the determined phase may serve as a phase reference for the transformation of the near field to the far field, for example, for the (fast) Fourier transform.

Finally, a total radiated power metric may be applied to at least one beam direction of the device under test 12 (step S7), in particular at the frequencies of the spurious emissions. The total radiated power metric may serve as a benchmark for evaluating the emission characteristics of the device under test 12.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A measurement system comprising:
    a device under test, at least a first antenna and a second antenna, a reflector device, a shielded space and a signal analysis module;
    the first antenna being configured to at least one of generate electromagnetic waves directed to the reflector device or receive electromagnetic waves reflected by the reflector device;
    the reflector device being configured to reflect electromagnetic waves between the first antenna and the device under test;
    the second antenna being positioned in a near-field area of the device under test;
    at least the second antenna being connected to the signal analysis module;
    the device under test, the first antenna, the second antenna and the reflector device being assigned to the shielded space,
    wherein a shielding member is provided, the shielding member being assigned to the shielded space, and the shielding member being positioned between the first antenna and the second antenna, and wherein the shielding member separates a far-field area of the device under test from a near-field area of the device under test.

2. The measurement system according to claim 1, wherein at least one of the first antenna or the device under test is configured to generate electromagnetic waves within a predetermined frequency band.

3. The measurement system according to claim 2, comprising at least one signal generation module being connected to at least one of the first antenna or the device under test.

4. The measurement system according to claim 1, wherein the second antenna is configured to receive an electromagnetic signal provided by the device under test.

5. The measurement system according to claim 1, wherein at least one of the first antenna or the second antenna is configured as a link antenna.

6. The measurement system according to claim 1, wherein at least one of the first antenna or the second antenna is stationary relative to the shielded space.

7. The measurement system according to claim 1, wherein a positioning unit is provided that is configured to adjustably hold the device under test in a position.

8. The measurement system according to claim 7, wherein the positioning unit is configured to adjust a position of the device under test in two dimensions or in three dimensions.

9. The measurement system according to claim 1, comprising a third antenna being mounted stationary relative to the device under test.

10. A measurement system comprising:
    a device under test, at least a first antenna and a second antenna, a reflector device, a shielded space and a signal analysis module;
    the first antenna being configured to at least one of generate electromagnetic waves directed to the reflector device or receive electromagnetic waves reflected by the reflector device;
    the reflector device being configured to reflect electromagnetic waves between the first antenna and the device under test;
    the second antenna being positioned in a near-field area of the device under test;

at least the second antenna being connected to the signal analysis module;

the device under test, the first antenna, the second antenna and the reflector device being assigned concurrently to the shielded space, wherein the first antenna is configured to measure far field properties of the device under test, and wherein the second antenna is configured to near field properties of the device under test.

11. The measurement system according to claim 10, comprising a third antenna being mounted stationary relative to the device under test.

* * * * *